(12) United States Patent
Billingslea et al.

(10) Patent No.: US 10,581,790 B2
(45) Date of Patent: Mar. 3, 2020

(54) SYSTEMS AND METHODS FOR INITIATING, MAINTAINING, AND ANALYZING OF CONCURRENT STATEFUL MULTI-WAY CONVERSATIONS

(71) Applicant: Till Mobile, Inc., Los Gatos, CA (US)

(72) Inventors: Wes Billingslea, Los Gatos, CA (US); Nick Crafford, Los Gatos, CA (US); Henry Ivey, Los Gatos, CA (US)

(73) Assignee: TILL MOBILE, INC., Los Gatos, CA (US)

( * ) Notice: Subject to any disclaimer, the term of this patent is extended or adjusted under 35 U.S.C. 154(b) by 39 days.

(21) Appl. No.: 16/023,144

(22) Filed: Jun. 29, 2018

(65) Prior Publication Data

US 2019/0007363 A1 Jan. 3, 2019

Related U.S. Application Data

(60) Provisional application No. 62/527,493, filed on Jun. 30, 2017.

(51) Int. Cl.
*H04L 12/58* (2006.01)

(52) U.S. Cl.
CPC ............ *H04L 51/36* (2013.01); *H04L 51/046* (2013.01); *H04L 51/066* (2013.01); *H04L 51/38* (2013.01)

(58) Field of Classification Search
None
See application file for complete search history.

(56) References Cited

U.S. PATENT DOCUMENTS

| | | | | |
|---|---|---|---|---|
| 8,204,082 B2* | 6/2012 | Jungck | ............. | H04L 29/12066 370/498 |
| 8,463,860 B1* | 6/2013 | Guruswamy | ........... | H04L 43/50 707/602 |
| 8,547,974 B1* | 10/2013 | Guruswamy | ........... | H04L 43/50 370/389 |
| 8,612,530 B1* | 12/2013 | Sapovalovs | ............. | H04L 43/50 707/602 |

* cited by examiner

*Primary Examiner* — Azizul Choudhury
(74) *Attorney, Agent, or Firm* — Patterson & Sheridan, L.L.P.

(57) ABSTRACT

Systems and methods discussed herein are associated with initiating and maintaining multi-way stateful conversations with mobile communication devices with varying capabilities and network support that may be located in different nations worldwide. These stateful conversations may involve one or more messages to mobile devices which may be sent based upon previous responses or response histories of the mobile devices. The system's users may also be able to query the system to better support the requesting party and to work with and among other users of the system.

4 Claims, 2 Drawing Sheets

SYSTEMS AND METHODS FOR INITIATING, MAINTAINING, AND ANALYZING OF CONCURRENT STATEFUL MULTI-WAY CONVERSATIONS

CROSS-REFERENCE TO RELATED APPLICATIONS

This application claims priority to U.S. Provisional Patent Application Ser. No. 62/527,493, filed on Jun. 30, 2017, which herein is incorporated by reference.

BACKGROUND

Broadcast communications may be used to transmit information to targeted companies and individuals, these communications may be one-way communications used to broadcast information or opportunities and may direct the viewers of the messages sources of further information or opportunity.

SUMMARY

Additional features and characteristics of the disclosed embodiments will be explained in the description which follows and will be apparent to those having ordinary skill in the art upon examination of the following discussion.

In one embodiment, a system for initiating two-way stateful conversations comprises an application stored in a non-transitory memory of a server. The system also comprises a first data store comprising a plurality of rules and a plurality of conversation content associated with requests for conversation initiation received by a request acceptor application. The system further comprises a second data store comprising a plurality of state information associated with a plurality of user devices. The request acceptor application, when executed by a processor, is configured to receive a request to initiate a conversation with a plurality of target user devices, wherein the request comprises at least one rule, identifying information associated with the plurality of target user devices, and the plurality of conversation content. The request acceptor application is further configured to parse the at least one rule and the plurality of conversation content from the identifying information and transmit the parsed at least one rule and parsed pluralities of conversation content to a first data store. The request acceptor application is further configured to transmit the identifying information to a second data store and receive a conversation activation request from the second data store based on information transmitted to the second data store from the request acceptor application. The request acceptor application is also configured to retrieve, based on the conversation activation request, from the second data store, an initial conversation state of each user device of the plurality of user devices previously stored in the second data store. The request acceptor application is also configured to retrieve, from the first data store, the at least one rule and apply the at least one rule associated with transmission of content. The request acceptor application is further configured to transmit, subsequent to applying the at least one rule and based on the initial conversation state associated with each user device of the plurality of user devices previously stored in the second data store, a portion of the content from the conversation request. The request acceptor application is also configured to change, subsequent to transmitting the portion of the content, the initial conversation state of the target user devices to which the portion of the content was transmitted to an ACTIVE conversation state.

In another embodiment, a system for two-way stateful conversations comprises an application stored in a non-transitory memory of a server. The system further comprises a first data store comprising a plurality of rules and conversation content associated with requests for conversation initiation received by a request acceptor application. The system also comprises a second data store comprising a plurality of state information associated with a plurality of user devices. The request acceptor application, when executed by a processor, determines, based upon a plurality of target user devices associated with a conversation initiation request, which target user devices of the plurality of target user devices are part of the plurality of user devices stored in the second data store, wherein the conversation initiation request comprises the plurality of target user devices, a plurality of rules, and a plurality of content. The request acceptor application also determines a conversation state for target user devices of the plurality of target user devices that are determined to be part of the plurality of user devices stored in the second data store. The request acceptor application further determines, based upon the plurality of target user devices associated with a conversation initiation request, which target user devices of the plurality of target user devices are not part of the plurality of user devices stored in the second data store. The request acceptor application also determines a communication capability of each of a first set of target user devices, wherein the first set of target user devices is a subset of the plurality of target user devices and comprises user devices determined to not be stored in the second data store and user devices that are determined to be both stored in the second data store and associated with predetermined conversation states. The request acceptor application further transmits a first portion of content to the first set of target user devices and subsequently receives, from the first set of target user devices, a response to the first portion of content. The request acceptor application also determines, based on at least one rule of a plurality of rules associated with the conversation initiation requests, when a second portion of content is to be transmitted and to which target user devices of the first set of target user devices the second portion is to be transmitted to. The request acceptor application further transmits, based on the determination associated with the at least one rule, the second portion of content to a second set of target devices.

In yet another embodiment, a method of generating and maintaining stateful conversations comprises receiving, by an application stored in a non-transitory memory of a server and executable by a processor, a request for initiating a conversation, wherein the request comprises a plurality of target devices, at least one content portion, and a plurality of rules. The method further comprises parsing, by the application, the at least one content portion and the plurality of rules from the request to form a first set of parsed information associated with the request. The method also includes storing the first set of parsed information in a first data store and parsing, by the application, the plurality of target devices from the request to form a second set of parsed information. The method further comprises storing, by the application, the second set of parsed information in a second data store and comparing, by the application, the second set of parsed information to a plurality of user devices previously stored in the second data store, wherein the plurality of user devices previously stored in the second data store are associated with at least one of a previously initiated conversation. The method also includes generating, based on the comparison, a first set of target devices and a second set of target devices, wherein each of the first set of target devices was previously stored in the second data store, and wherein each of the second set of target devices was determined, based on the comparison, to not have been previously stored in the second data store. The method also comprises determining, by the application, which target devices of the first set of target devices are associated with a predetermined conversation state. The method further includes transmitting, by the application, the at least one content portion to target devices of the first set of target device which are determined to be associated with the predetermined conversation state and transmitting to the second set of target devices. The method further comprises receiving, by the application, in response to the transmitting, a plurality of responses from the plurality of target devices that received the transmission. The method also includes transmitting, by the application, the plurality of responses to a party associated with the request.

BRIEF DESCRIPTION OF THE DRAWINGS

For a detailed description of the disclosed embodiments, reference will now be made to the accompanying drawings in which.

DETAILED DESCRIPTION

Figure 1:
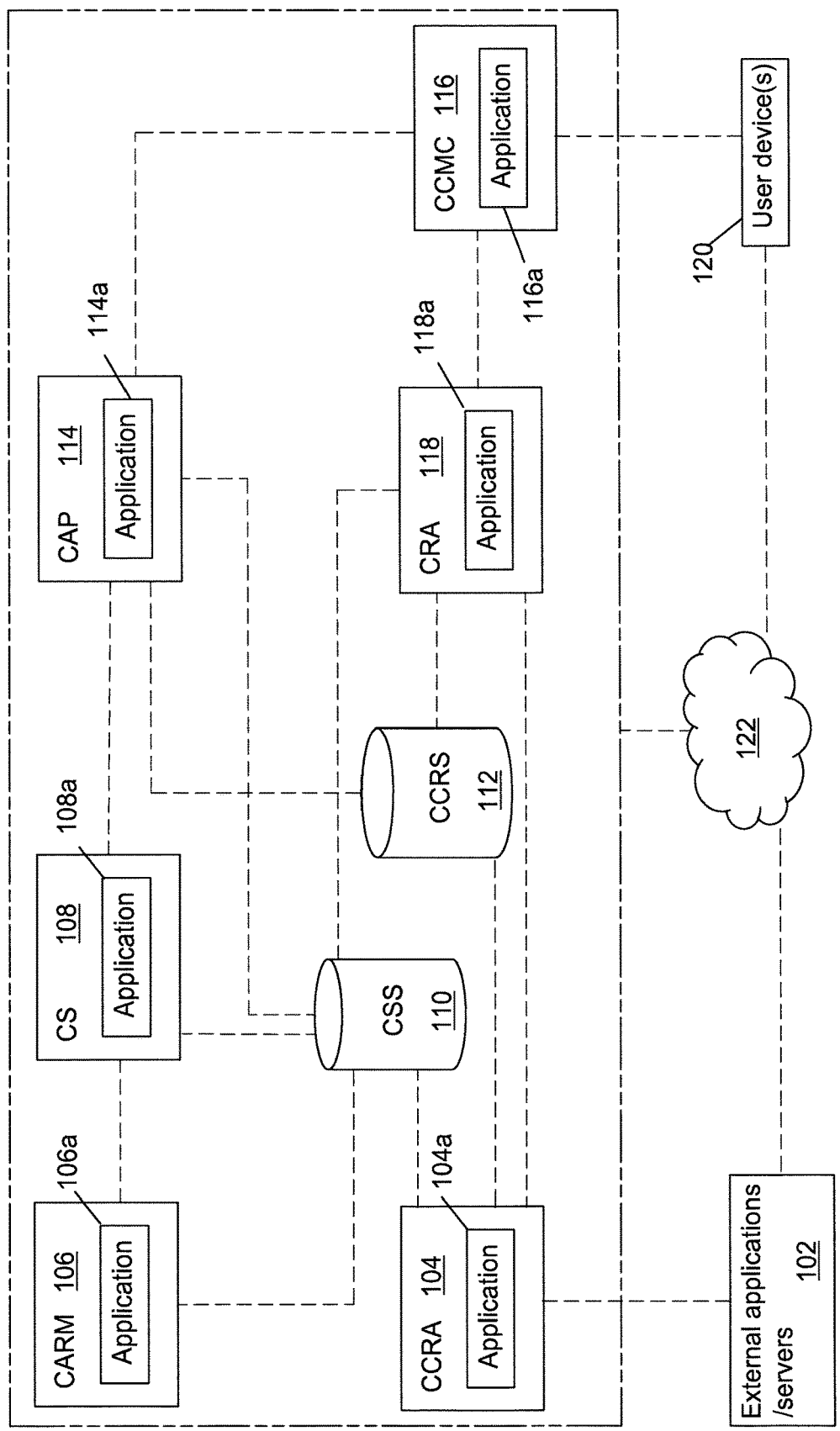
FIG. 1 is a system configured to initiate and maintain conversations and conversation data among and between parties.

The systems and methods discussed herein are directed towards the management of concurrent stateful conversations with multiple participants (recipient devices) over disparate communications channels and across a plurality of devices with varying device properties. Using the systems and methods discussed herein, support is provided via a plurality of technologies and a plurality of communications channels such as those supported by a variety of telecommunications service providers and associated brands worldwide. This support enables conversations comprising a broadcast message to be initiated with a plurality of recipient devices, regardless of the communication capabilities (e.g., voice/text), geolocation, and/or provider platform that supports those recipient devices. A "broadcast message" is a message sent via a plurality of platforms in a plurality of forms (voice/text) to multiple recipient devices of differing types. A broadcast message may be sent to a subscriber list or another pre-defined list of recipient devices, and is conventionally a message that is a one-way communication. That is, the broadcast message is sent to the devices and received by the devices, but the message does not have a transactional component that enables two-way communication.

Platforms currently employed to transmit broadcast messages may not enable conversation queuing, data validation, response to data validation, normalization and integration of data, localization of data, transmission failure identification, rerouting in response to failure, or load balancing. Thus, parties requesting broadcast message transmission may not be able to receive feedback regarding if messages were delivered and/or opened, especially if the recipient devices span a broad range of geolocations, technical capabilities (text/voice/etc.), and network/application support. This may lead to inefficient and/or incomplete transmissions, and/or transmissions that include information in formats that may not be able to be received and viewed by the users of the recipient devices.

Using the systems and methods discussed herein, a broadcast message may be sent to a plurality of devices and a conversation with the recipient devices is initiated based upon the transmission of the broadcast message. This enables a conversation to be established with each recipient device, where the device receives a broadcast message, responds, and may receive and respond to subsequent messages. This leveraging of broadcast platforms to create multi-way conversations with a plurality of recipient devices enables emergency response feedback, human resources management, inventory management, and other business systems, to execute more efficiently and effectively using less processing power and at a reduced cost given the automated nature of the system. In addition, this leveraging of broadcast platforms may be employed to determine and optimize bandwidth and/or connection efficiency across a range of device and network types and capabilities.

Voice and messaging capabilities including MMS, SMS, VOIP, and other such platforms are used as discussed herein to receive broadcast messages and respond to broadcast messages. The broadcast messages are transmitted to initiate conversations based on a plurality of rules associated with each broadcast message. The rules applied to a conversation initiated with a broadcast message may be contained in a conversation initiation request received by the system from a server associated with a remote entity. In some embodiments, the conversation initiation requests are received automatically according to a predetermined schedule, for example, a labor schedule, a delivery schedule, or an ordering schedule, in order to dynamically update a dashboard or other display accessible to a plurality of users in a plurality of separate locations. In an embodiment, a conversation is initiated, in response to receiving the conversation initiation request, by transmitting a broadcast message to a plurality of recipient devices specified in the conversation initiation request.

Depending upon the embodiment, the rules associated with the conversation initiation request may determine which, if any, subsequent messages are to be sent, and to which recipients the messages are to be sent. The rules can provide for subsequent message transmission, for example, based on the type, content, and/or number of responses received in response to the broadcast message. This determination affects, and may result in, a change in a conversation state associated with a recipient device. A conversation state of the recipient device may indicate whether a conversation is currently in progress with the device ("ACTIVE"), whether a conversation was previously initiated with the device ("COMPLETED"), and/or if a conversation is currently queued to be delivered to the device, ("QUEUED"). The state of a device is stored and may be dynamically updated such as to create a device state history. If there are not any QUEUED conversations waiting behind an ACTIVE conversation, then the ACTIVE conversation can persist between a device pair indefinitely. This enables the asynchronous nature of messaging e.g., the ability of SMS/MMS to be preserved. The data may be stored in a data center. Data may also be retrieved in real time from external systems for usage. The data may also be available via an application programming interface.

In contrast to conventionally employed broadcast messaging systems, embodiments of the systems and methods discussed herein enable the recipient devices to interact with the broadcast message and subsequent messages to establish a two-way stateful conversation such that the responses sent by the recipient devices may impact whether and which subsequent messages are sent to the recipient devices. The conversations are stateful in that a recipient device is associated with a conversation state (herein referred to as a "state"). A plurality of state identifiers may be employed, for example, a state associated with a recipient device may be "QUEUED," "ACTIVE," or "COMPLETE." In an embodiment, a "QUEUED" state may be used to indicate that a conversation has not yet been initiated with a recipient device but is to be transmitted, a "COMPLETE" state may indicate either that the rules associated with the conversation initiation request have been satisfied by the recipient device or that the conversation timed out. An "ACTIVE" state may indicate that a conversation has been initiated with a recipient device and that a response or responses are pending, but that a predetermined time has not lapsed such that the recipient device would have its state changed to "COMPLETE."

In some embodiments, the conversation state is associated with a conversation initiation request from the same party that is now requesting a second conversation such that a single recipient device is not engaged with the same initiating party in two simultaneous or overlapping conversations. In some embodiments, the conversation state of the device is not additionally defined by the initiating party of the conversation and multiple conversations from the same initiating party may be associated with an ACTIVE state simultaneously. This stateful communication process causes the party requesting feedback from the recipient devices to engage in two-way communication with those devices, via the system, regardless of the device type, make, model, geolocation, communication capabilities, or supporting platform. This two-way communication enables more efficient processes for the requesting party. These processes may include supply chain management (inventory management), human resource management, emergency services, polling, and other processes where two-way communication is desired, especially when there are disparate device properties and/or communication channels involved.

In an embodiment, an external system or application transmits a request to a Conversation Creation Request Acceptor (CCRA) to send a broadcast message and initiate a conversation with a plurality of devices. The CCRA comprises a server or a plurality of servers that stores a plurality of applications executable by a processor to receive messages from remote applications and servers, transmit conversation initiation request content and rules to a Conversation State Store, and transmit conversation request recipient device information to a Conversation Content and Rules Store. Both stores are discussed in detail below.

This request may be referred to as a "conversation request" or as a "conversation initiation request," and may comprise the message or messages to send (the content), as well as a plurality of rules associated with initiating and maintaining the conversation. The conversation may be initiated by the system sending out a first broadcast message, and the conversation may be maintained by reformatting responses into a desired/requested format and transmitting one or more subsequent messages of the conversation based on the rules and responses received.

Each conversation initiation request received by the CCRA may comprise content (text to be read or heard by a user of the recipient device), a plurality of recipients, and at least one rule, and may more typically be associated with a plurality of rules. The conversation rules may comprise a schema for what message is to be sent first to initiate the conversation, as well as what, if any, messages are to be sent, based on a response received to a previously sent message. In an embodiment, the conversation rules may further or alternatively comprise shorthand syntax, question validation (remote and internal), question branching, message injection, sub conversations, and question skipping. Question branching may be a term used to describe a path of a tree such as a response tree that is associated with logic that may be based on the conversation rules and/or historical data associated with a user's device or with a conversation requestor.

In some embodiments, the rules may also comprise feedback mechanisms as requested by the party sending the request for a conversation to the CCRA. In an embodiment, the rules may comprise the transmission of a read receipt, a response time window after which a conversation state is to be changed to "COMPLETE," a delivery confirmation, an indication of delivery failure, a format of a desired response or responses as desired, and a plurality of options for sending subsequent messages based on responses to the broadcast message. In an embodiment, a COMPLETE state may be associated with a recipient device once a conversation has been terminated according to the plurality of rules contained in the conversation initiation request associated with that conversation. Creating an association between a recipient device and a conversation state may comprise creating a link between a state and a device identifier such as an associated ISP, a device serial number, or a device phone number, and then storing this link in a data store for later retrieval, use, and/or analysis.

In another embodiment, a COMPLETE state may be associated with a recipient device that, according to a rule associated with the conversation initiation request, was inactive and/or unresponsive to one or more messages. This inactivity and/or unresponsiveness may be determined based upon a status of a read receipt and/or a status of a delivery receipt. In one example, if a predetermined time passes between a delivery attempt and a delivery confirmation, and/or between a delivery confirmation and a read confirmation, the conversation may be associated with a COMPLETE state. This may be the situation when, for example, a predetermined number of box seats are available for a concert and there is a choice of days, number of seats, or other options wherein two-way stateful communication is desirable so that the opportunity may be presented to more recipients if the initial recipients are uninterested or unavailable/unresponsive after a predetermined time period.

In an embodiment, the CCRA accepts the conversation initiation request and sets an initial conversation state associated with the request to "QUEUED," since the broadcast message has not yet been transmitted. The CCRA parses the request and transmits the conversation content and rules to a Conversation Content and Rules Store ("CCR" store) for storage and later retrieval. The CCRA further transmits the initial conversation state and the list of message recipients, e.g., the recipient devices, to a Conversation State Store ("CS" store).

The CS store provides an environment for the persistent storage of conversation states associated with recipient devices. The CS store is configured such that that the system can manage multiple conversations and requests for conversations for recipient devices that may already have active conversations. This may be accomplished in part because a recipient device may have a state associated with it based on a previously transmitted conversation, and this state may be employed to determine if, and/or when, to initiate a new conversation.

In an embodiment, a conversation activation request is sent from the CS store to a Conversation Activation Request Mailbox (CARM). The CARM comprises one or more data stores on a server or servers. The CARM acts as a buffered mailbox of conversation activation requests that are partitioned in first-in-first-out (FIFO) queues by device tuples. A tuple is a discrete list of recipients defined by identifiers such as phone or mobile device (including tablets, laptops, etc.) numbers. An application executing on the server where the CARM is stored, in response to receiving the conversation activation request message, can transmit a message to a Conversation Supervisor (referred to herein as "CS" or "Supervisor") to activate the conversation in the conversation activation request message.

The Conversation Supervisor comprises a server where one or more applications are stored and executable by a processor to at least (1) process conversation activation requests from the CARM serially, in FIFO order, (2) retrieve states of referenced conversations from the CS store to determine if a device slated to receive a broadcast message is associated with an ACTIVE state or if the recipient device has previously had a conversation initiated, (3) set conversation states to an ACTIVE state for recipient devices that are not currently associated with an ACTIVE state; and (4) set conversation states to COMPLETE in response to a determination that a conversation has been idle, e.g., not responded to within a predetermined time period or not responded to in a way that is sufficient to interpret and process the response.

In an embodiment, the Conversation Supervisor can retrieve a conversation state associated with a recipient device from the CS store. Depending upon the conversation initiation request rules and/or state associated with the recipient device, the Conversation Supervisor may send a message to a Conversation Activator Processor (CAP) to trigger the initiation of the conversation, e.g., the sending of the broadcast message to at least some of the plurality of recipient devices. The recipient devices to which the broadcast message is sent may then be associated with an ACTIVE state, and such association may be stored in the CS store. In an embodiment, the CS is configured to select devices associated with a QUEUED conversation state for transmission of the conversation content based upon a predetermined time a device has been associated with that state, after which point the state can be reset and the device's responsiveness or lack thereof may be stored in the CS store.

In an embodiment, the CAP is an application stored on a server that may or may not comprise other components of the system discussed herein. In an embodiment, the CAP is configured to retrieve conversation content and rules from the CCR store and execute the stored rules to build an output (broadcast message) to be sent to a Conversation Communication Method Converter (CCMC). This output may comprise the content of the message for the user to read, to hear, or to otherwise receive such that the recipient is able to understand and respond to the message. The CAP is further configured to set a conversation state of a recipient device to QUEUED if the conversation has not been initiated, for example, when the recipient device is already associated with an ACTIVE state. In another example, a recipient device may have its state changed to ACTIVE after the conversation is initiated but prior to the rules being satisfied. In some embodiments, an ACTIVE state is assigned to a recipient device in response to a delivery confirmation being received by the CAP, and in alternate embodiments, an ACTIVE state is assigned in response to a read confirmation and/or a delivery confirmation being received by the CAP.

The CAP may be further configured to set a state of a conversation associated with a particular recipient device to COMPLETE if a conversation does not require a response, e.g., if the broadcast message content is related to a facility closure or school delay due to weather, or is otherwise intended to inform without interaction from the recipient users. In some examples, the CAP may transmit a message containing the output to be processed, e.g., the responses, as an input to the Conversation Communication Method Converter (CCMC).

The CCMC is an application stored on a server that, when executed by a processor, normalizes, optimizes, and transmits raw inputs (conversation content) from the CAP into communication methods that are appropriate for the recipient devices. These communication methods may include voice, SMS, or MMS. The CAP is further configured to transmit the conversation to the recipient devices which may include personal digital assistants (PDAs), smartphones, voice-only enabled phones including landlines, as well as tablets, laptop computers, desktop computers, and wearable technology. The conversion method can be voice-to-text, text-to-voice, or other formats depending upon the capabilities of the recipient devices. The CCMC is further configured to accept inputs from recipient devices via various communication methods and to normalize the response and transmit the response to the Conversation Response Acceptor (CRA), discussed in detail below. The optimization and normalization discussed herein refer to a process executed on, for example, a conversation where a rule indicates that a "y" or "n" answer is desired, but the user sends back "yes" or "uy" or something other than a "y" or "n," either because they are not paying attention or due to user error. The CCMC normalizes the response to remove the excessive characters prior to transmitting the response to the CRA so that the response is in a format that may be stored and analyzed. For example, a result of a conversation initiation request may comprise an output that indicates: 400 broadcast messages sent, 200 "y" responses received, 150 "n" responses received, 50 unresponsive or unidentifiable responses received. A recipient device may be deemed unresponsive if a read receipt is received from the device but a response is not received from the same device within a predetermined period of time. These results may be transmitted to the requestor, and may also be stored on the system in the CS store. The stored information may be analyzed to determine what recipient devices respond the most (highest percentage), which are the least responsive (lowest percentage), which devices respond with the longest and shortest lead times, etc. This resultant information may be further analyzed and future recipient lists may be in part determined by the requesting parties based upon the analysis of device behavior during previous conversations, such as which recipient devices responded, the type of response received, and/or how quickly the devices responded.

In an embodiment, the CRA is an application configured to accept response data from the CCMC and to apply the conversation rules to the responses to determine if and which subsequent message output(s) are to be transmitted back to the CCMC for transmission to the recipient devices. The CRA is also configured to transmit a message to the CS store to change a conversation state to COMPLETE for a recipient device if it is determined that the rules of the conversation have been satisfied based on the responses received by the CCMC and transmitted to the CRA after normalization/optimization. In an embodiment, the CRA may send a message comprising the raw output message to the CCMC for conversion to the appropriate method(s), communicate with the CCR store to retrieve and update rules, and/or transmit a request for creation of a conversation to the CCRA.

In an embodiment, the SMS exchange that may be used in the system, for example, and stored as part of the CCMC, may employ a separate API. Information stored based upon conversations that were responded to by targeted user devices via the SMS exchange may comprise information associated with the success of communications paths for the conversation initiation and maintenance. This information may include which communications channels were used for (1) different types of targeted user devices, and (2) target devices in different geographic locations. The system may use this information, including indications of conversations that were not received and/or viewed, to determine and dynamically improve conversation transmissions based upon both the reliability and expense of previous transmissions. It is noted that various intermediary platforms may be used by the system discussed herein for the transmission of communications, and that those platforms may be selected by the system based upon factors including rules associated with conversations, previously stored information regarding target user devices, and previously stored information regarding devices of similar communication capabilities and/or in a similar geographic location. Each intermediary platform may be associated with a cost or schema of costs for and reliability of transmission which may be tracked and stored by the system. The system may aggregate data as conversations are initiated and responded to by numerous user devices and base transmission paths at least in part upon not only the cost but the previous success rate, which may include successful transmission, read receipts, responses, timing of responses, time from transmission to read receipt, and accuracy of responses. This may be referred to as "intelligent" routing. Machine learning may be employed herein. Such artificial intelligence (AI) may be employed for voice-to-text, querying results of previous conversation replies, quantifying results of previous conversation replies, and determining continuing process improvement for decision/response trees.

Examples

Human Resources Management:

In one example, a company wants to schedule a plurality of employees for a particular shift by starting a conversation with a first group of employees. Using other systems, the company may send out a broadcast message with an instruction to call a number to schedule a shift, and it may be challenging and costly for the company to schedule employees and/or fill unexpectedly opened shifts. In contrast, using the systems and methods discussed herein, the company can initiate conversations with employees to fill shifts based on seniority, availability, skillset, title, and other aspects of an employee profile that are stored on the system as a plurality of rules. The first group of employees may receive a broadcast message via the system. Based on the response of each employee (recipient device), the system determines, via a tree or schema of rules, what if any subsequent messages are to be transmitted to the recipient device. In one example, the tree may be referred to as a response tree since responses received may impact which "branch" of the tree contains the next step/content to transmit and/or rule impacting transmission. By establishing conversations via this two-way communication, the company can, for example fill shifts and back-fill shifts when employees call in sick or are no-shows. The company is also able to determine behavior patterns of employee responses, such as which recipient devices respond in the least amount of time, which take the longest, and which do not respond at all, which may indicate an invalid contact number for the employee. In addition, the company may make messages such as "Which day(s) of the week are you open to working overtime?" and other messages that may relate to the scheduling of future opportunities. In this example, a message for a Wednesday shift is sent to a recipient device list that includes recipients that have previously indicated in other conversations that Wednesday is a preferred date.

An application associated with the company transmits a message to the CCRA; the message is a request for creation of a conversation with a first plurality of employees and comprises message content and a plurality of rules. The CCRA parses the request and sends the participant (recipient device) list to the CS store and sends the rules and content to the CCR store. Based upon the list of recipients stored in the CS store, the Conversation Supervisor determines if conversations are currently active with some or all of those recipients. If the Conversation Supervisor determines that there are active conversations, it may change the status to COMPLETE based on the rules associated with the conversation. If the Conversation Supervisor determines that there are no active conversations for some or all of the recipients, it transmits a request to initiate a conversation and change a status associated with the recipients' phone numbers.

In one example, if there are conversations associated with recipient devices that are associated with an ACTIVE state, the Conversation Supervisor may determine, based on the status stored in the CS store and a rule or rules from the CCR store that are associated with the ACTIVE message, whether or not a rule such as a duration of time or a number of a type (e.g., "yes") of responses have been received. For example, if 10 "yes" responses received by the CCMC and confirmed by the CRA satisfy the rule or rules from a previously initiated conversation, and all 10 were received from recipient devices, a response from some or all ACTIVE state devices is no longer needed to satisfy the rule, if that is the sole rule that determines when a recipient device that did not respond is to be associated with a state of COMPLETE. In this example, the ACTIVE states for those devices may be changed to COMPLETE and stored as such in the CS store. When a new conversation is initiated with one of the recipient devices that is associated with a COMPLETE status, its status may again be associated with an ACTIVE state. In some examples, if a rule associated with a previous messages is configured to associate an unresponsive device with a lower priority for receiving offers for shifts, the unresponsive (ACTIVE state) devices may be associated with a flag in the CS store which may affect the recipient device's receipt of future shift opportunities.

In another example, the Conversation Supervisor determines that some or all of the recipient devices are engaged in conversations from the employer and are associated with an ACTIVE state for those devices. The Conversation Supervisor may then determine, based on the rules associated with those conversations, whether the state is to be changed to COMPLETE for those conversations and the new conversation is to be initiated and assigned an ACTIVE state, or if the state of the previously initiated conversations is to remain ACTIVE and the state of the new conversation is to be assigned and stored in the CS store as QUEUED.

In an embodiment, the Conversation Supervisor transmits a message to the CAP to initiate a conversation, and the CAP transmits a message containing the output to be processed as an input for the conversation to the CCMC. Subsequently, the CCMC converts the conversation content from the CAP such that the recipient devices can receive the conversation regardless of whether the device associated with the recipient is a smart phone, analog phone, tablet, laptop, desktop, land line, or other device, and based upon a geolocation in which the device is located. Based upon the type of recipient device, the system may determine how the conversation is to be transmitted, for example, SMS, MMS, VOIP, or other format. In addition, based on the location of the recipient device, an appropriate platform that is available in the region in which the device is located may be selected.

In this example, the conversation is initiated by the CCMC transmitting the content to the plurality of recipients. The CCMC may be configured to receive an indication from the recipient device as to whether the conversation was received and/or viewed. The CCMC may be further configured to accept responses to the broadcast message as well as responses to subsequent messages sent based upon the CRA's analysis of responses in light of conversation rules. In an embodiment, CCMC transmits the information received from the recipient devices to the CRA which determines the next steps based on the plurality of rules. In one example, if the conversation content requested a yes/no response, that response may be transmitted to the CRA via the CCMC. The CRA first determines if the response was received in the format specified by the rules and then, based upon that determination, may convert or otherwise normalize the response. The CRA may then determine, based on the responses received from the CCMC, if at least one subsequent message is to be sent, which subsequent message is to be sent, and to which recipient device(s) the subsequent message is to be sent. In an embodiment, for example if the employer has union employees or other employees with negotiated and/or contractual rules about scheduling, this may be expressed in the form of rules that are transmitted with the conversation initiation request, and those rules are stored in the CCR store and later retrieved by the CRA.

In an embodiment, if a first recipient replies "yes" to accept a shift, the CRA may determine based on the rules stored in the CCR store that a confirmation message is to be sent to the recipient that comprises content confirming the date, time, and other information about the accepted shift. In this example, the CRA sends the subsequent message to the CCMS for conversion and transmission to the recipient who accepted the shift. In another example, if a first recipient replies "no," that message is transmitted to the CCMC. The CCMC passes the response to the CRA to be evaluated against the stored rules. The rules associated with the conversation may cause a message to be sent to a different recipient (for example, someone with more or less seniority), or may cause a message to be sent to the same recipient with a different time, date, or duration of the shift.

This two way stateful communication enables the employer to schedule employees for shifts based upon shift availability, employee skillset, employee seniority, and other rules as determined by the employer or related union or other employment agreements. The system provides feedback as to whether messages were delivered and viewed, and can queue initial or subsequent messages from a part of a conversation based on a stored state associated with at least one of the recipients. In an embodiment, the system, for example, via the CCMC, is configured to transmit response data to the requesting entity to automatically populate the shift schedule with information associated with the recipient devices that accepted the shifts.

Emergency Services

In another example, the system may be employed to determine the health status of a plurality of individuals and to either refer help to the users' locations and/or direct the users to check-in points and emergency health resources. It is to be appreciated that, in the event that the emergency is an accident at a job site or company facility, as opposed to a natural disaster, similar methods as those discussed below may be employed. Thus, the users discussed in this example may have opted-in to an emergency notification system of their own volition, or may be included on a message recipient list (tuple) by virtue of an area code and/or geolocation associated with the recipient device.

In this example, a private entity or government entity may transmit a request for a conversation to the CCRA. The request comprises content and rules that may take the form of a decision/response tree, such that an initial message is sent to the plurality of users to initiate the conversation. In an embodiment, the conversation may be initiated with a first plurality of devices as discussed above by transmitting a first message such as "Are you able to get to a second location? Answer y/n." In response to a "y," a second message of the conversation may be transmitted to the "y"-responding devices based upon a determination by the CRA that transmits a request to the CCMC to transmit the second message. This second message may comprise directions to a safe place or a meeting place, and may be based upon the "y" response as well as, in some cases, on a rule that may associate a recipient with a safe location or meeting space based upon the phone number of the recipient or the geolocation of the recipient, e.g. by team or by location associate with the number. In a similar fashion, a different message may be sent to the devices that replied "n," for example, a second message of the conversation may comprise "do you need immediate medical attention?" or "do you need transportation," or both, in subsequent messages. In some embodiments, a particular response may trigger the system to send a link to the device from which the recipient can summon local emergency services. In alternate embodiments, the system may be configured to automatically contact those services on behalf of the device in response to a predetermined trigger.

Real-Time Inventory Management

In another example, the system may be used for purchasing and inventory management. If a chain of grocery stores strives to source local products, the system may be employed to populate a dashboard that enables each location of the chain to see what inventory is available, the type of inventory available, and the status of products that have been ordered or pre-ordered.

In this example, the CCRA may receive a request from a grocery store location to initiate a conversation with a plurality of vendors who supply produce to the stores. This conversation initiation request may be directed to the purchasing of a specific type of product, or may be directed towards gathering information on the types and quantities of all available produce, dairy, grains, or other products. The broadcast message may be transmitted in a manner similar to that discussed above, and the responses that are received by the CCMC and transmitted to the CRA may also be transmitted, for example, by the CRA, to a remote system that populates a dashboard based on the feedback. This dashboard may be employed by the grocery chain so that each store is able to view current and future product availability by vendor and type of product.

In this example, the grocery store chain's individual stores, central office, and individual vendors such as farmers may be able to transmit conversation initiation requests via the CCRA. The conversation initiation requests from the store(s) may comprise content that will be used to indicate that the grocery store would like to purchase a particular type/amount of product that is indicated as available, and to receive feedback to the dashboard that would indicate to the store what type and quantities of product are currently available, and what may be available during a predetermined time period. In other examples, the conversation initiation requests from the store may comprise content that is an inquiry from the store to the vendor as to when a particular type or quantity of a product will be available.

In another example, the vendors may send requests to initiate conversations to the CCRA to determine what products the stores desire, what products they would take as a replacement, and to indicate if there were any events such as weather events that may impact the supply and/or delivery of product. The stateful communication of the system may further enable both the vendors and the stores to determine if there are outstanding/ACTIVE conversations, in order to ensure that there are no double orders or missed orders, or other miscommunication that may result in waste. In some examples, when a vendor initiates the conversation initiation request via the CCRA, the store's system may automatically respond if the request comprises a previously defined format. In an embodiment, this format may be referred to as a template, which has been designed to communicate with the store's system. This template may involve item numbers, a desired weight measurement (kg. v. lbs.), or other aspects of a vendor delivery/ordering system that may interact with a store's inventory system. The dashboard and conversation system may be further used in certain embodiments to confirm inventory and adjust the inventory levels reflected on the dashboard, for example, based upon a rule that triggers an update to the dashboard when an order is received, confirmed, and/or fulfilled, so that multiple stores viewing the dashboard simultaneously or during overlapping time periods have dynamic, real-time or near-real-time updates of inventory and projected inventory.

Cross-Platform Use by Requestors

In addition to the conversation platform discussed above by requestors seeking conversation initiation and/or conversation status updates, the platform may also be employed for requestors to obtain information about each other and to communicate across the platform. In one example, an SMS exchange that may be a part of the CCMC which may be employed not only to conversations with a plurality of user devices via a plurality of carriers worldwide upon request, but also to facilitate communications among and between requestors. That is, when a corporation or solo business owner registers to use the platform, a profile is created for the user. Initially, for new users, the profile may contain user-input information such as the business name, industry (such as farming, manufacturing, customer care, supply chain), sub-industry (sub-industries of farming may include dairy, grains, fruits, vegetables), qualifiers (organic/non-organic, union workers, multiple locations), existing capacity, contact(s), and a service/options plan. The services/options plan may differ by what sort of access a user is granted. For example, some users may register (and pay for) only to use the system for conversation initiation and response, while some may additionally register to communicate with other users and/or retrieve data for their own profile as well as the profiles of other users, which may comprise a known-data option and an anonymized-data option. Subsequent to a user's use of the system to initiate conversations and receive feedback from these conversations, some or all of the information surrounding those conversation requests, such as the content, rules, targeted devices, as well as feedback associated with those aspects of a conversation request, may be stored in the system and associated with the profile of the user who initiated the conversation requests.

In addition, users may be able to communicate with targeted user devices, for example, if a grocery store chain's target user devices include farmers. In one example, a user registers for the system and connects to it via a mobile device. The user then may enter data specific to their farming operations such as types of products farmed as well as a time of planting, volume of planting, time of harvest, volume of harvest, quality or grade of harvest (if appropriate to describe animal products and/or organic status) and yield of harvest for each product farmed. This information populates a data store that can then be used by (1) the user to determine when to order seeds and other supplies and/or how to adjust for weather patterns and by (2) parties looking to purchase farmed products, as well as by (3) other competing farmers. For example, if Farmer A wants to grow apples, he can query the data store, and if he is a registered user of the system, can determine what volumes, types, and delivery dates other farmers' are already directing their crops towards, as well as the geographic areas covered by those other farmers. This data may be anonymized so that Farmer A can determine what crops to grow and when based upon what supply is predicted to be available in a particular geographic area during a time period, but cannot tell which other farmers are responsible for those products. In an alternate example, the data is not anonymized such that Farmer A can contact Farmer B directly with any questions regarding her production, and Farmer B can answer back. This two-way communication may also be possible in the anonymized embodiment, depending upon the configuration of a registered user's profile on the system.

In one example, if credit is desired in order to procure supplies for growing, the user may apply for, receive, and reconcile this credit with the platform itself as opposed to with a third party. The user may update crop information in the system, e.g., if weather ruins a portion of a crop or leads to an unexpectedly high yield, and the user may also use the system including the credits obtained via the system to order supplies for planting and harvesting. The registered users of the system may also opt-in for updates regarding weather in their area, in competitor's areas, in desired areas of sale, and provide related advice and warnings that may be dynamically transmitted to a registered user's devices or devices in order to assist the system's users in obtaining high yields and quality.

The user may initiate the planting and harvesting process once the supplies are received, and update the system with information regarding yields, changes to product mixes, or other information related to the growth and harvesting of a particular product. When the product is harvested, the system may be accessed by the user in order to reconcile any credit obtained via the system as well as to finalize the sale. It is noted that the buyer(s) of the product may be obtained prior to planting, during growth, or at harvest, via the system, which may then be used as an intermediary to handle payment. The farmers' profiles may be updated throughout the growing process as noted above, as well as at the point of sale. That is, the system is dynamically updated as products are (1) planted, (2) grown, (3) harvested, (4) and sold so that other farmers as well as buyers have real-time information about product quality, location, and availability. The sales discussed herein may be via individual small business owners, distribution centers, or other retailers, and this sale information may also be captured in the system.

While farmed products are discussed in some examples, these products are not limited to soil-grown items and may include hydroponic or other growth systems, as well as animal products. In other examples, retailers and manufacturers may use the same system to tie into each other as well and use the system in a similar fashion to the farmers. Therefore, the system may be used for registered users who are farmers to determine what to grown and when. In some examples, a registered user may also be a targeted user device, for example, if a grocery store or chain is the registered user and a plurality of farmers are associated with targeted user devices, those farmers may also be registered users who may employ the system to set up profiles and growing information as discussed above. Thus, the system enables registered users and targeted user devices to communicate directly via the system, which enables the transmission of data and communications between devices of varying technologies supported by different platforms worldwide. In particular, in developing regions worldwide, the system is thereby able to reduce the barrier of entry to the market of smaller vendors since they have access to growing information from their counterparts who may be far away or inaccessible due to other factors. The system additionally enables corporations and other business owners to access vendors who are located in remote regions and/or have limited access to technology.

In addition, the system may provide an opportunity for registered users as well as their suppliers to rate each other, and may contribute to vertical expansion and horizontal management for the parties involved. The configuration of the system discussed herein enables front-end users, e.g., registered users, to communicate with each other and to query stored data regarding a registered user's activities including past and current performance, and enables back-end users, e.g., the recipients of the communications, to potentially interact with each other directly or to query data associated with other recipients to determine supply chain overages and holes, both product-based and geography-based. It is appreciated that a form of system registration may be executed by the recipients of the communications in order to provide this system access, and that, in some cases, a front-end user may register a plurality of devices for system access as a part of its registration process or as a part of a conversation request.

FIG. 1 is a system 100 configured to initiate and maintain conversations and conversation data among and between parties. The system 100 comprises a Conversation Creation Request Acceptor (CCRA) 104 configured to receive a request to send a broadcast message and initiate a conversation with a plurality of devices 120. These devices 120 may comprise various types (personal digital assistant, smartphone, mobile phone, data-enabled phones, phones that are not data-enabled, land lines, laptop computers, tablets, hybrid devices, and wearable technology) and be located in countries worldwide, supported by a diverse group of telecommunications service providers and brands under those providers. The CCRA is accessible via a variety of wired and wireless technologies (including Wi-Fi, LTE, or Bluetooth), to a plurality of external applications and/or servers 102 located remotely. This plurality of remote devices 120 may comprise desktops, tablets, laptops, PDAs, wearable technology, or other mobile devices that may have SMS, voice, MMS, and data capabilities, including the download of dedicated applications configured to interface with the system 100.

In an embodiment, the CCRA 104 comprises a server that stores at least one application 104a executable by a processor to, for example, receive messages from remote applications and servers 102 and transmit conversation initiation request content and rules received in the request from the device 120 to a Conversation State store 110. The CCRA 104 may also be configured to transmit recipient device information (e.g., information about the devices 120 to which the conversation of the request are to be transmitted) to a Conversation Content and Rules store ("CCR" store) 112. Both stores 110 and 112 are discussed in detail below.

In an embodiment, the CS store 110 provides an environment for the persistent storage of conversation states associated with devices 120. These states may be used by various components of the system 100 to determine (1) if a user device 120 has previously been requested in a conversation initiation request from an external application 102; (2) if so, the system 100 may determine if a state is associated with the device 120; (3) what the state is; and (4) if the requested conversation can be sent to the user device 120 in light of the determined state associated with that device.

The CS store 110 is configured such that that the system 100 can manage multiple conversations and requests for conversations for devices 120 that may already have conversations associated with an ACTIVE state. This may be accomplished in part because a recipient device 120 may have a QUEUED or COMPLETE conversation state associated with it based on a previously transmitted conversation, and this conversation state may be employed to determine if and when to initiate a new conversation, at which point the conversation state would be changed to ACTIVE.

In an embodiment, a conversation activation request is sent from the CS store 110 to a Conversation Activation Request Mailbox (CARM) 106. The CARM 106 comprises a data store (not shown) on a server which hosts a buffered mailbox of conversation activation requests that are partitioned in first-in-first-out (FIFO) queues by device tuples. An application 106a executing on the server where the CARM 106 is stored, in response to receiving the conversation activation request message, may transmit a message to the CS 108 to activate the conversation requested in the conversation activation request message. It is to be appreciated that both data stores 110 and 112 are discussed herein as transmitting and receiving information, and when information is transmitted from either data store 110 or 112 to other components of the system 100, this transmission may be in response to a request sent to the data store and/or it may be a retrieval of information from the data store. In alternate embodiments, the data stores 110 and 112 are in communication with servers storing applications that communicate between the components of the system 100 and the data stores 110 and 112 to engage in information transmission and receipt.

The Conversation Supervisor (CS) 108 comprises a server where one or more applications 108a are stored and executable by a processor to at least (1) process conversation activation requests from the CARM serially, in FIFO order, (2) retrieve states of referenced conversations from the CS store to determine if a device slated to receive a broadcast message is associated with an ACTIVE state or if the recipient device has previously had a conversation initiated, (3) set conversation states to an ACTIVE state for recipient devices that are not currently associated with an ACTIVE state; and (4) set conversation states to COMPLETE in response to a determination that a conversation has been idle, e.g., not responded to within a predetermined time period or not responded to in a way that is sufficient to interpret and process the response.

In an embodiment, the CS 108 may transmit a message to a Conversation Activator Processor (CAP) 114. The CAP 114 comprises an application 114*a* stored on a server that may or may not comprise other components of this system. That is, one or more of the components 104, 106, 108, 118, and 116 may be in the form of individual applications on one or more servers. In an embodiment, the CAP 114 is configured to retrieve conversation content and rules from the CCR store 112 and execute the stored rules to build an output (broadcast message). This broadcast message, which may also be referred to as content or a first portion of content, is sent by the CAP 114 to a Conversation Communication Method Converter (CCMC) 116, comprising an application 116*a*. This output may comprise the content of the message for the user to read, to hear, or to otherwise receive such that the recipient is able to both understand and respond to the message. The CAP 114 is further configured to set a conversation state of a recipient device to QUEUED if the conversation has not been initiated, for example, when the recipient device is already associated with an ACTIVE state. In another example, a recipient device may have its state changed to ACTIVE after the conversation is initiated but prior to the rules being satisfied. In some embodiments, an ACTIVE state is assigned in response to a delivery confirmation being received by the CAP, and in alternate embodiments, an ACTIVE state is assigned in response to a read confirmation and/or a delivery confirmation being received by the CAP.

The CAP 114 may be further configured to set a state of a conversation associated with a particular recipient device to COMPLETE if a conversation does not require a response, e.g., if the broadcast message content is related to a facility closure or school delay due to weather, or is otherwise intended to inform without interaction from the recipient users. In some examples, the CAP 114 may transmit a message containing the output to be processed, e.g., the responses, as an input to the CCMC 116.

The CCMC 116 comprises application stored on a server that, when executed by a processor, normalizes, optimizes, and transmits raw inputs (conversation content) from the CAP 114 into communication methods that are appropriate for the recipient devices. These communication methods may include voice, voice-to-text, text-to-voice, SMS, MMS, or email, as well as a platform associated with the transmission, e.g., an application that may be stored on the users' devices and configured to enable the user to interpret and respond to the conversation. The CCMC 116 is further configured to transmit the conversation to the recipient devices 120 which may include personal digital assistants (PDA), smartphones, voice-only enabled phones including landlines, as well as, tablets, laptop computers, desktop computers, and wearable technology.

The CCMC 116 is further configured to accept inputs from recipient devices via various communication methods and to normalize the response and transmit the response to the Conversation Response Acceptor's (CRA) 118, discussed in detail below. The optimization and normalization discussed herein refer to a process executed on, for example, a conversation where a rule indicates that a "y" or "n" answer is desired, but the user sends back "yes" or "uy" or something other than a "y" or "n," either because they are not paying attention or due to user error. The CCMC 116 may normalize the response to remove the excessive characters prior to transmitting the response to the CRA 118 so that the response was in a format that may be stored and analyzed. For example, a result of a conversation initiation request may comprise an output that indicates: 400 broadcast messages sent, 200 "y" responses received, 150 "n" responses received, 50 unresponsive or unidentifiable responses received.

A recipient device 120 may be deemed unresponsive if a read receipt is received from the device but a response is not received from the same device within a predetermined period of time. These results may be transmitted to the requestor, and may also be stored on the system in the CS store 110. The stored information may be analyzed to determine what recipient devices 120 respond the most (highest percentage), which are the least responsive (lowest percentage), which devices 120 respond with the longest and shortest lead times, etc. This resultant information may be further analyzed and future recipient lists may be in part determined by the requesting parties based upon the analysis of device behavior during previous conversations. In addition, the system 100 may be configured to analyze and learn from communications, both transmissions and receipts. This analysis may be performed by the CRA 118 and/or CCMC 116, and may include information such as which recipient devices 120 received the message from the CCMC (was transmission completed?), which devices 120 responded, which devices 120 opened the message, the type of response received (for example, did the party accept the offer/shift or click on a link?), whether the response received was in the correct (requested) form, and/or how quickly the devices 120 responded after receiving and/or opening the message.

In an embodiment, the CRA 118 is an application configured to accept response data from the CCMC 116 and to apply the conversation rules to the responses to determine if and which subsequent message output(s) is to be transmitted back to the CCMC 116 for transmission to the recipient devices. The CRA 118 is also configured to transmit a message to the CS store 110 to change a conversation state to COMPLETE for a recipient device if it is determined that the rules of the conversation have been satisfied based on the responses received by the CCMC 116 and transmitted to the CRA 118 after normalization/optimization. In an embodiment, the CRA 118 may send a message comprising the raw output message to the CCMC 116 for conversion to the appropriate method(s), communicate with the CCR store 112 to retrieve and update rules, and, in some embodiments, the CRA 118 is configured to transmit a request for creation of a conversation to the CCRA 116.

As shown in FIG. 1, the components 104-118 may be connected via wired or wireless connections, and in some cases via a network 122, that may also enable communications between the system 100, the external applications and servers 102 and the user devices 120. In an embodiment, the CCRA 104 is in communication with the plurality of external applications and servers 102, as well as the CCR store 112, the CS store 110, and the CRA 118. As used herein, the term "communicate" is used to mean at least one-way communication, transmission or reception, with at least one other component. The CS store 110 may be configured to be in communication with applications 108*a* on the CS 108, application 106*a* on CARM 106, the application 114*a* on the CAP 114, and the application 118*a* on the CRA 118, in addition to the application 104*a* on the CCRA 104. The CARM may additionally be in configured to communicate with the CS 108, which may be configured to communicate with the CAP 114. The CAP 114 may be further configured to communicate with the CCMC 116 and the CCR 112, which may also be configured to communicate with the CRA 118. The CCMC 116 may be configured to communicate with the plurality of user devices as well as the CRA 118. The applications discussed in FIG. 1 and below in FIG. 2, for example, the applications 104a, 106a, 108a, 114a, 116a, and 118a, may be individual applications executed by separate processors (not shown) on individual, separate servers. In alternate embodiments, the system 100 may comprise a suite of applications 104a, 106a, 108a, 114a, 116a, and 118a, on a single server, which may be referred to as a single application.

Figure 2:
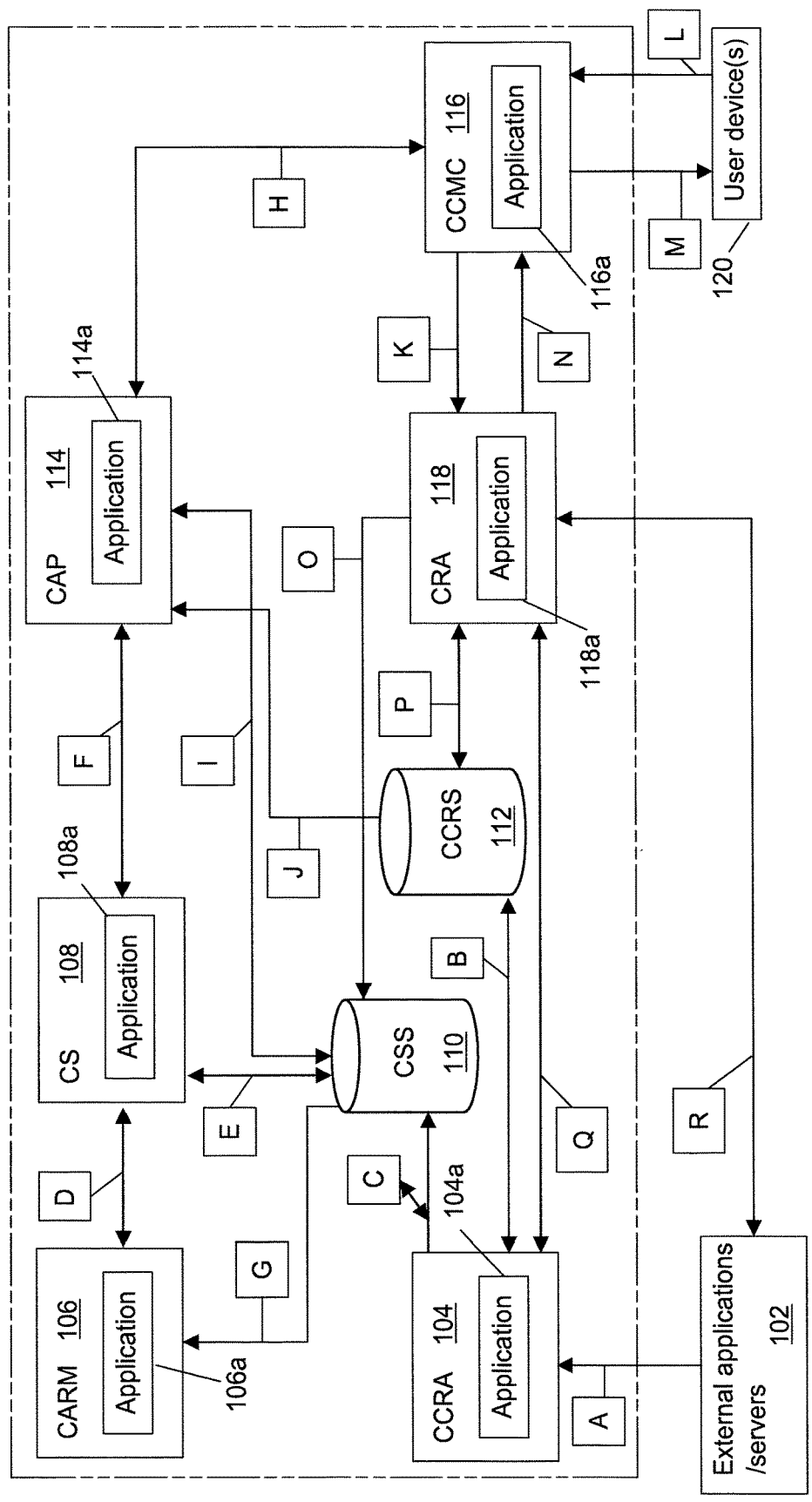
FIG. 2 is a flow chart of a method of initiating and maintaining conversations among and between parties.

FIG. 2 is a flow chart of a method 200 of initiating and maintaining conversations among and between parties. In an embodiment of the method 200, at path A, the CCRA 104 receives a request from a remote device of a plurality of remote applications and/or servers 102. This plurality of remote devices 120 may be located citywide, regionally, nationwide, or worldwide, operating on a plurality of diverse platforms with varying communication capabilities, and may be associated with users of the system 100 that each have a profile established upon registration with the system 100. The requests received at path A may comprise content, rules, and a plurality of target user devices 120 to which a broadcast message is to be sent to initiate a conversation. The CCRA 104, in response to receiving the requests at path A, parses content and rules from the request and transmits the conversation initiation request content and rules to the CS store 110 at path C. The CCRA 104 additionally transmits conversation request recipient device information from the requests received to the CCR store 112 at path B.

In an embodiment, a conversation activation request is sent from the CS store 110 to the CARM 106 at path G in response to the CS store 110 receiving parsed information from the CCRA 104. The CARM 106, at path D, in response to receiving the conversation activation request message at path G from the CS store 110, may transmit a message to the Conversation Supervisor (CS) 108 to activate the subject conversation of the conversation activation request message. The CS 108 may, in response to receiving the request at path G, retrieve a conversation state associated with a recipient device from the CS store 110 at path E. A recipient device 120 may have a state associated with it based on a previously transmitted conversation, and this state may be employed to determine if and when to initiate a new conversation.

Depending upon the conversation initiation request rules and/or state associated with the target recipient (user) device in the CS store 110, as determined by the CS 108 at path E, the CS 108 may send a message to the CAP 114 at path F to trigger an initiation of the conversation, e.g., to trigger the sending of the broadcast message to at least some of the plurality of recipient devices. In an embodiment, the CAP 114 is configured to retrieve conversation content and rules from the CCR store 112 at path J and execute the rules retrieved from the CCR store 112 to build an output (broadcast message) to be sent to the CCMC 116 at path H. This output may comprise the content of the message for the user to read, to hear, or to otherwise receive such that the recipient is able to understand and respond to the message. In some examples, the message transmitted by the CAP 114 to the CCMC 116 at path H may also contain the form expected from the responses, which may be based on a rule associated with the request.

In alternate embodiments, the CAP 114 may be further configured to set the conversation state of a target user device 120 to, for example, QUEUED, depending upon the information retrieved from the CCR store 112 at path J. The recipient devices 120 to which the broadcast message is transmitted may then be associated with an ACTIVE state by the CAP 114. This conversation state may be stored in the CS store 110 at path I. The rules associated with the request may be employed by the system 100 in order to determine which, if any, target devices associated with the QUEUED conversation state are to be kept as target devices, and/or if alternate devices are to be substituted without re-attempting to send the conversation to a first tier of targeted user devices. A tiered or branched system for transmission of conversation content or portions of conversation content may be employed, for example, in the case of shift work or replacements for shift work where user devices associated with employees of higher seniority levels may receive the content (e.g., the option to accept the shift work) prior to those of lower seniority, whose devices may be associated with a second tier with which a conversation is initiated if first tier devices are unresponsive or already associated with a QUEUED or ACTIVE.

The CCMC 116, via the application 116a, may normalize, optimize, and/or transmit raw inputs (conversation content) from the CAP 114 received at path H into communication methods that are appropriate (transmittable) for the recipient devices and transmitted at path M to the plurality of user devices 120. The "appropriate" communication methods used for transmission at path M may include, for example, voice, SMS, or MMS, and may be determined based upon data stored in the CS store 110 and/or data supplied by the requestor. At path L, subsequent to the transmission(s) at path M, the CCMC 116 is further configured to accept inputs from recipient devices via the various communication methods. In an embodiment, the CAP 114 may also be configured to transmit a message to the CS store 110 at path I to change a conversation state to COMPLETE for a recipient device if it is determined that the rules of the conversation have been satisfied based on the responses received by the CCMC 116 at path L and transmitted to the CRA 118 at path K after normalization/optimization by the CCMC 116.

At path K, the CCMC may normalize the response and transmit the response to the CRA 118, discussed in detail below. Normalization by the CCMC 116 may include the removal of excessive characters prior to transmitting the response to the CRA 118 at path K so that the response is in a format that may be stored and analyzed by the CRA 118 or other system 100 components. These results may be transmitted by the CRA 118 to the requesting server 102 at path R. In another example, the results (responses) may also be stored on the system in the CS store 110 at path O and/or in the CCR store at path P depending upon the type of information transmitted.

In an embodiment, the CRA 118 not only accepts response data from the CCMC 116 at path K but also applies the conversation rules to the responses to determine if and which subsequent message output(s) is to be transmitted back to the CCMC 116 at path N for transmission to the recipient devices at path M. In an embodiment, the CRA 118 may send a message comprising the raw output message to the CCMC 116 for conversion to the appropriate method(s) at path N. The CRA 118 may also communicate with the CCR store 112 at path P upon receiving response data at path K to retrieve and update rules to determine if additional portions of the initial conversation are to be transmitted at to the CCMC at path N 116 and/or if new conversations are to be initiated by the CCRA 104, in which case the communication to initiate the new conversation is transmitted along path Q from the CRA 118 to the CCRA 104.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

| Name | Abbrev. | Example Functionalities |
|---|---|---|
| Conversation Creation Request Acceptor | CCRA | Receives request from user/app<br>Transmits requested conversation content to CS store<br>Transmits conversation state and participant/recipient device information to CCR store |
| Conversation State Store | CS store | Receives storage status and participant/recipient device information<br>Initiates/triggers requests for conversation activation due to status changes of participants/recipient devices |
| Conversation Activation Request Mailbox | CARM | Receives conversation activation requests and partitions/parses by FIFO<br>Transmits message to the Supervisor requesting that the CAP activate the conversation |
| Conversation Supervisor | Supervisor | Receives conversation activation requests from CARM<br>Retrieval of conversation state<br>Depending on conversation status, transmits data to change a conversation state associated with a device to ACTIVE<br>Transmits message notifying the CAP to initiate the conversation |
| Conversation Activation Processor | CAP | Builds conversation output by executing rules retrieved from the CCR Store<br>Transmits conversation to CCMC<br>Transmits status for conversation to COMPLETE (when applicable) to CS Store |
| Conversation Communication Method Converter | CCMC | Optimizes raw conversation input from the CAP and normalizes for multi-device and platform distribution based on recipient device information<br>Transmits message to user(s)<br>Receives active (answer) and passive (was it delivered/read) feedback from user(s)<br>Transmits feedback from users to CRA so that the CRA can determine if subsequent action is needed (based on rules) |
| Conversation Response Acceptor | CRA | Accepts response data from CCMC<br>Compares (applies) response data to rules for the associated conversation<br>Determines subsequent output (if any) to be pushed to the user via the CCMC<br>Transmits data to the CS Store to change status of conversation to COMPLETE<br>Retrieves new and updated rules/conversation content from the CCR Store<br>Requests conversation reaction from CCRA in hotline example<br>Transmits output to CCMC for conversion into a transmittable form |
| Conversation Content & Rules Store | CCR store | Stores conversation content, rules, surveys with complex validation and/or decision trees that are retrieved by the CAP and CRA |

What is claimed is:

1. A system for initiating two-way stateful conversations, comprising:

an application stored in a non-transitory memory of a server;

a first data store comprising a plurality of rules and a plurality of conversation content associated with requests for conversation initiation received by a request acceptor application;

a second data store comprising a plurality of state information associated with a plurality of user devices;

wherein the request acceptor application, when executed by a processor, is configured to:

receive a request to initiate a conversation with a plurality of target user devices, wherein the request comprises at least one rule, identifying information associated with the plurality of target user devices, and the plurality of conversation content;

parse the at least one rule and the plurality of conversation content from the identifying information;

transmit the parsed at least one rule and parsed pluralities of conversation content to a first data store;

transmit the identifying information to a second data store;

receive a conversation activation request from the second data store based on information transmitted to the second data store from the request acceptor application;

retrieve, based on the conversation activation request, from the second data store, an initial conversation state of each user device of the plurality of user devices previously stored in the second data store;
retrieve, from the first data store, the at least one rule;
apply the at least one rule associated with transmission of content;
transmit, subsequent to applying the at least one rule and based on the initial conversation state associated with each user device of the plurality of user devices previously stored in the second data store, a portion of the content from the conversation request; and
change, subsequent to transmitting the portion of the content, the initial conversation state of the target user devices to which the portion of the content was transmitted to an ACTIVE conversation state.

2. The system of claim 1, wherein the at least one rule comprises a schema for what content portion is to be sent first to initiate the conversation, a response tree, shorthand syntax associated with the content, remote question validation, internal question validation, question branching, message injection, sub conversations, and question skipping.

3. The system of claim 1, wherein the initial conversation state is one of QUEUED or ACTIVE.

4. The system of claim 1, wherein the application is further configured to:
determine which devices of the plurality of target user devices were not previously stored in the second data store;
store the devices in the second data store that were not previously stored in the second data store; and
associate the stored devices with a conversation state of ACTIVE subsequent to transmission of the portion of the content.

* * * * *